United States Patent
Kuroki (10) Patent No.: US 9,316,316 B2
(45) Date of Patent: Apr. 19, 2016

(54) SEGMENTED SEAL

(71) Applicant: EAGLE INDUSTRY CO., LTD., Tokyo (JP)

(72) Inventor: Yasuhiro Kuroki, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/652,688

(22) PCT Filed: Sep. 19, 2013

(86) PCT No.: PCT/JP2013/075361
§ 371 (c)(1),
(2) Date: Jun. 16, 2015

(87) PCT Pub. No.: WO2014/103446
PCT Pub. Date: Jul. 3, 2014

(65) Prior Publication Data
US 2015/0369367 A1    Dec. 24, 2015

(30) Foreign Application Priority Data

Dec. 25, 2012  (JP) ................. 2012-281110

(51) Int. Cl.
*F16J 15/30* (2006.01)
*F16J 15/24* (2006.01)
*F16J 15/44* (2006.01)

(52) U.S. Cl.
CPC ...... *F16J 15/30* (2013.01); *F16J 15/24* (2013.01); *F16J 15/442* (2013.01)

(58) Field of Classification Search
CPC ..... F16J 15/34; F16J 15/3404; F16J 15/3408; F16J 15/3412; F16J 15/3416; F16J 15/3436; F16J 15/344; F16J 15/3452; F16J 15/3464
USPC ......................................... 277/372, 373, 422
See application file for complete search history.

(56) References Cited

U.S. PATENT DOCUMENTS 2,984,505 A * 5/1961 Andresen ................. F16J 15/36
                                                           277/373
3,575,424 A * 4/1971 Taschenberg .......... F16J 15/441
                                                           277/411

(Continued)

FOREIGN PATENT DOCUMENTS

JP      S63-177359      11/1998
JP      H11-108197       4/1999

(Continued)

*Primary Examiner* — Kristina Fulton
*Assistant Examiner* — L. Susmitha Koneru
(74) *Attorney, Agent, or Firm* — Harness, Dickey & Pierce, P.L.C.

(57) ABSTRACT

Provided is a segmented seal that is capable of suppressing the progress of wear in a key groove and thereby attains improvement in the durability of a seal ring. The segmented seal includes a key groove (15), as seen in an axial direction, has a groove body portion (15a) extending in a radial direction and a pair of clearance groove portions (15b, 15c) expanding to both sides of the groove body portion (15a) so as to be away from a key (50) on the inner peripheral surface side, and among the pair of clearance groove portions (15b, 15c), the clearance groove portion (15c) on an upstream side in a rotating direction ® of the rotating shaft (200) is configured to expand to an outer peripheral surface side beyond a tip end (50a) on an inner peripheral surface side of the key (50).

1 Claim, 6 Drawing Sheets

(56) References Cited

U.S. PATENT DOCUMENTS

| | | | | |
|---|---|---|---|---|
| 3,743,303 A | * | 7/1973 | Pope | F01D 11/00 277/422 |
| 5,145,189 A | * | 9/1992 | Pope | F16J 15/441 277/544 |
| 5,411,298 A | * | 5/1995 | Pollack | F16J 15/164 285/106 |
| 6,679,678 B2 | * | 1/2004 | Giesler | F16J 15/348 277/372 |
| 8,740,224 B2 | * | 6/2014 | Zheng | F16J 15/344 277/370 |
| 2008/0237995 A1 | * | 10/2008 | Khonsari | F16J 15/3404 277/390 |

FOREIGN PATENT DOCUMENTS

| | | |
|---|---|---|
| JP | 2001-289328 | 10/2001 |
| JP | 2001-289329 | 10/2001 |

\* cited by examiner

SEGMENTED SEAL

CROSS-REFERENCE TO RELATED APPLICATIONS

This application is a National Stage of International Application No. PCT/JP2013/075361, filed Sep. 19, 2013, which is based on Japanese Application No. 2012-281110, filed Dec. 25, 2012. The entire disclosures of each of the above applications are incorporated herein by reference.

FIELD

The present disclosure relates to a segmented seal including a seal ring made of carbon having a structure in which the seal ring is segmented into a plurality of segments in a circumferential direction.

BACKGROUND

In the past, there has been known a segmented seal that seals an annular gap between a rotating shaft and a housing. This segmented seal includes a seal ring made of carbon that is in intimate contact with a side wall face of an annular concave portion formed in the housing, is disposed to be slidable on an outer peripheral surface of the rotating shaft, and has a structure in which the seal ring is segmented into a plurality of segments in a circumferential direction thereof. As a method of making this seal ring non-rotatable with respect to the housing, there is known one in which a key groove is formed on an end face of the seal ring, and a key that is engaged with the key groove is secured to the housing.

In such a method, there is a problem that in accordance with the rotation, vibration and the like of the rotating shaft, wear progresses on an inner peripheral surface side (i.e., a rotating shaft side) of the key groove due to its sliding movement against the key as time passes, and hence a deterioration of the seal ring is caused.

CITATION LIST

Patent Literature

Patent Literature 1: Japanese utility model laid-open publication No. S63-177359
Patent Literature 2: Japanese patent laid-open publication No. 2001-289329

SUMMARY

Technical Problem

The object of the present disclosure is to provide a segmented seal that is capable of suppressing the progress of wear in a key groove and thereby attains improvement in the durability of a seal ring.

Solution to Problem

In order to solve the above-described problem, the present disclosure adopts the following means.

That is, the present disclosure resides in a segmented seal to seal an annular gap between a rotating shaft and a housing having a shaft hole through which the rotating shaft is inserted, and having an annular concave portion opened to each of an inner peripheral surface side and one side in an axial direction, characterized by comprising: a seal ring made of carbon being in intimate contact with a side wall face of the annular concave portion, and being disposed to be slidable on an outer peripheral surface of the rotating shaft, the seal ring being structured to be segmented into a plurality of segments in a circumferential direction thereof, a key being secured to the housing in a state of being engaged with a key groove provided on the one side in the axial direction of the seal ring; wherein the key groove, as seen in an axial direction, has a groove body portion extending in a radial direction and a pair of clearance groove portions expanding to both sides of the groove body portion so as to be away from the key on the inner peripheral surface side, and among the pair of clearance groove portions, a clearance groove portion on an upstream side in a rotating direction of the rotating shaft is configured to expand to an outer peripheral surface side beyond a tip end on an inner peripheral surface side of the key, and is configured such that radial and circumferential dimensions thereof are large as compared with a clearance groove portion on a downstream side.

According to the present disclosure, owing to the provision of the pair of clearance groove portions formed with the key groove, the vibration from the rotating shaft becomes less likely to transmit to contacting portions between the key groove and the key, thus it becomes possible to suppress the progress of the wear of the key groove.

In addition, generally speaking, due to a prolonged use, the key tends to shift within the key groove to a side wall face side on the upstream side in the rotating direction of the rotating shaft. Accordingly, within the key groove, wear tends to progress on the side wall face side on the upstream side. In contrast, in the present disclosure, the upstream side clearance groove portion is configured to expand to the outer peripheral surface side beyond the tip end on the inner peripheral surface side of the key. Accordingly, it is possible to prevent the tip end on the inner peripheral surface side of the key from making contact with the side wall face of the key groove, thereby making it possible to suppress the progress of the wear of the key groove effectively. In addition, the above-described upstream side clearance groove portion is configured such that its radial and circumferential dimensions are large as compared with the downstream side clearance groove portion. Thus, it is possible to suppress the progress of the wear of the key groove more effectively. Here, note that if the dimensions of both of the pair of clearance groove portions are made large, a strength degradation of the seal ring itself may be caused. In contrast, in the present disclosure, only the dimensions of the above-described upstream side clearance groove portion are made large, so that the progress of the wear of the key groove can be suppressed, while also suppressing the strength degradation.

Advantageous Effects of the Disclosure

As described above, according to the present disclosure, the progress of the wear of the key groove is suppressed and thereby making it possible to attain an improvement in durability of the seal ring.

DETAILED DESCRIPTION

Hereinafter, modes for carrying out the present disclosure will be exemplarily described in detail based on examples thereof with reference to the attached drawings. However, the dimensions, materials, shapes, relative arrangements and so on of component parts described in the examples are not intended to limit the scope of the present disclosure to these alone in particular as long as there are no specific statements.

Example

Hereinafter, a segmented seal according to an example of the present disclosure will be described while referring to FIGS. 1 through 11. Here, note that the segmented seal according to the example can be suitably used as a shaft seal of a jet engine for aircrafts, and can also be used as seals for rotary machine equipment and the like in various kinds of industrial machines.

<Segmented Seal>

Figure 8:
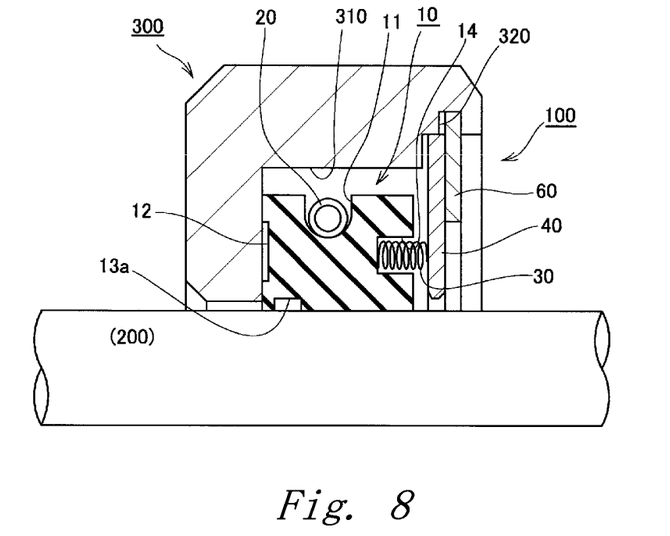
FIG. 8 is a schematic cross sectional view showing a mounted state of a segmented seal according to the example of the present disclosure.
Figure 9:
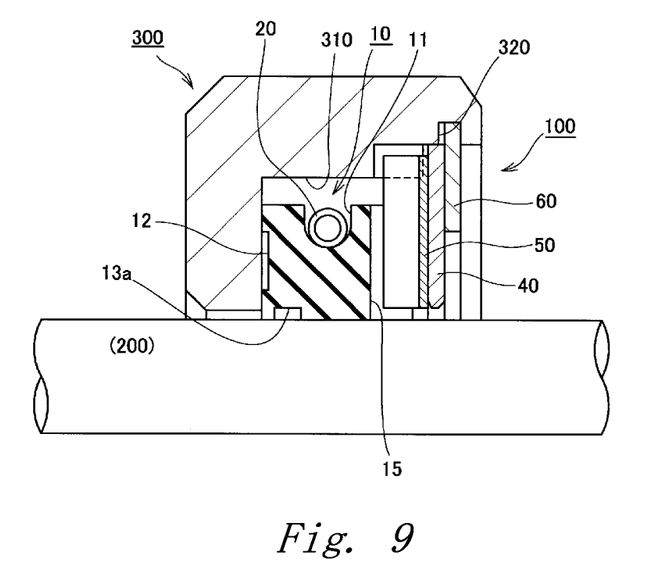
FIG. 9 is a schematic cross sectional view showing the mounted state of the segmented seal according to the example of the present disclosure.

The overall structure of the segmented seal 100 according to the example of the present disclosure will be described while referring to FIG. 8 and FIG. 9 in particular. FIG. 8 and FIG. 9 are schematic cross sectional views showing the mounted states of the segmented seal 100, and are each showing a cross sectional view intersected by a cross section including an axis. Here, note that the axis is a central axis of a rotating shaft 200 and other various kinds of annular members that constitute the segmented seal 100. In addition, FIG. 8 is a cross sectional view intersecting a portion of a seal ring 10 to be described later in which a compression spring hole 14 is formed, and FIG. 9 is a cross sectional view intersecting a portion of the seal ring 10 in which a key groove 15 is formed. Here, note that the seal ring 10 in FIG. 8 corresponds to an XX cross section in FIG. 1, and the seal ring 10 in FIG. 9 corresponds to a YY cross section in FIG. 1.

The segmented seal 100 according to the example seals an annular gap between the rotating shaft 200 and a housing 300 which has a shaft hole through which the rotating shaft 200 is inserted. The housing 300 has an annular concave portion 310 opened to each of an inner peripheral surface side and one side in an axial direction (i.e., the right side in FIGS. 8 and 9). The segmented seal 100 is fitted into this annular concave portion 310.

The segmented seal 100 is provided with the seal ring 10, an extension spring 20 that presses the seal ring 10 toward the inner peripheral surface side, and compression springs 30 that press the seal ring 10 toward a side wall face side (the other side in the axial direction) of the annular concave portion 310. In addition, the segmented seal 100 is further provided with a plate 40 that supports the compression springs 30, and keys 50 that serves to prevent the seal ring 10 from rotating with respect to the housing 300. Further, the segmented seal 100 is provided with a snap ring 60 that serves to prevent the seal ring 10, the extension spring 20, the compression springs 30, the plate 40, and the keys 50 from falling out to the one side in the axial direction from the annular concave portion 310.

Here, note that the keys 50 are secured to the plate 40 by means of welding or the like. As such, the plate 40 with the keys 50 being secured is referred to as a support member.

<Seal Ring>

Figure 1:
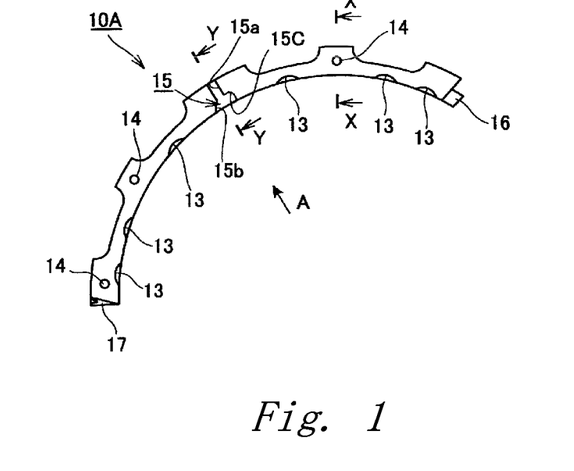
FIG. 1 is a view looking at a part that constitutes a seal ring according to an example of the present disclosure from one side in an axial direction.
Figure 2:
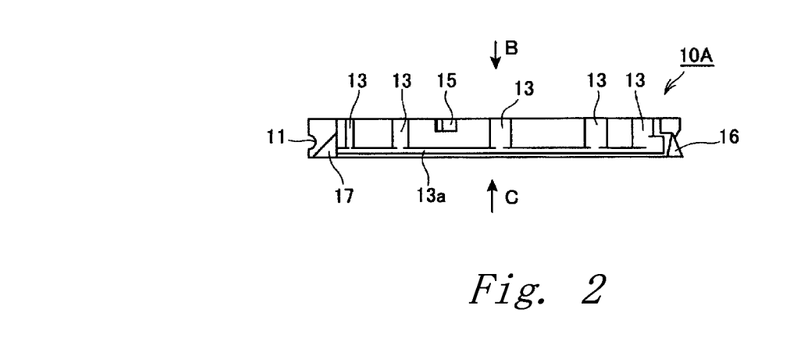
FIG. 2 is a view looking at the part that constitutes the seal ring according to the example of the present disclosure from an inner peripheral surface side.
Figure 3:
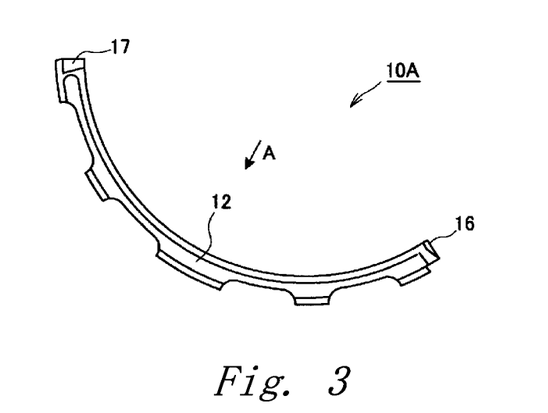
FIG. 3 is a view looking at the part that constitutes the seal ring according to the example of the present disclosure from the other side in the axial direction.
Figure 4:
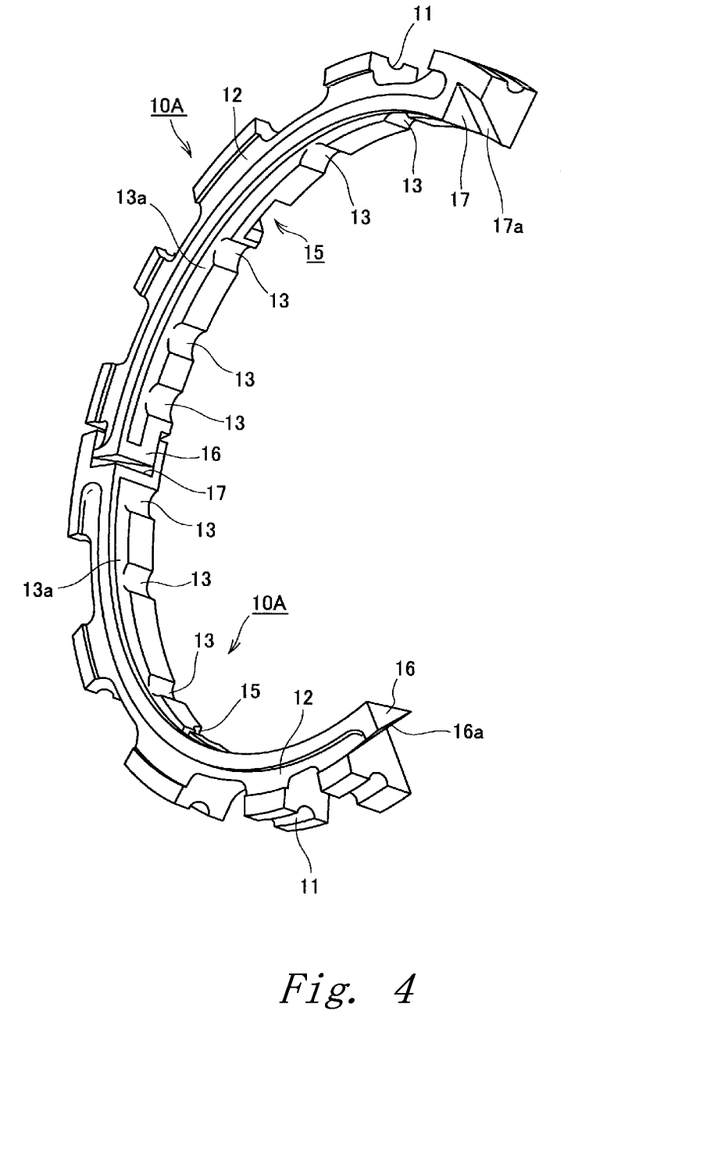
FIG. 4 is a view showing a state in which two parts that constitute the seal ring according to the example of the present disclosure are combined with each other.

The seal ring 10 according to the example will be described, while referring to FIG. 1 through FIG. 4 in particular. FIG. 1 is a view looking at a seal ring part 10A that constitutes the seal ring 10 according to the example from the one side in the axial direction. FIG. 2 is a view looking at the seal ring part 10A according to the example from the inner peripheral surface side. FIG. 3 is a view looking at the seal ring part 10A according to the example from the other side in the axial direction. Here, note that FIG. 2 is the view looking at the seal ring part 10A in a direction of arrow A in FIG. 1 and FIG. 3. In addition, FIG. 1 is the view looking at the seal ring part 10A in a direction of arrow B in FIG. 2, and FIG. 3 is the view looking at the seal ring part 10A in a direction of arrow C in FIG. 2. FIG. 4 is a perspective view showing a state in which two seal ring parts 10A according to the example are combined with each other.

The seal ring 10 is made of carbon, and is being structured to be segmented into a plurality of segments in a circumferential direction. In the example, the seal ring 10 of an annular shape is constituted by combining three seal ring parts 10A which are the same in dimensions and shape. The seal ring part 10A has an engagement convex portion 16 formed at one end thereof, and an engagement concave portion 17 formed at the other end thereof. Then, by combining three seal ring parts 10A with each other so as to engage one engagement convex portion 16 in one of two adjacent seal ring parts 10A with one engagement concave portion 17 in the other seal ring part 10A, the annular seal ring 10 can be obtained.

Here, the engagement convex portion 16 has an inclined face 16a that is inclined with respect to the axial direction as well as to a radial direction. In addition, the engagement concave portion 17 also has an inclined face 17a that is inclined with respect to the axial direction as well as to the radial direction. Then, when in the state in which the engagement convex portion 16 is engaged with the engagement concave portion 17, these inclined faces 16a, 17a are in a state in which they make slidable, face to face contact with each other. As a result, a sealing function is exhibited between the neighboring seal ring parts 10A with respect to both the axial direction and the radial direction.

The annular seal ring 10, that is composed of the three seal ring parts 10A combined with each other as described above, comprises: a groove 11 formed on an outer peripheral surface side, into which the extension spring 20 be fitted, pressure balancing grooves 12 formed at the other side in the axial direction, pressure balancing grooves (first pressure balancing grooves 13 and a second pressure balancing groove 13a) formed on the inner peripheral surface side, compression spring holes 14 into which the compression springs 30 be fitted, and key grooves 15.

The pressure balancing groove 12 formed on the other side in the axial direction of the seal ring 10 is disposed at one place on each seal ring part 10A so as to extend over a substantially entire area thereof in the circumferential direction. The pressure balancing grooves formed on the inner peripheral surface side of the seal ring 10 are composed of the first pressure balancing grooves 13 extending in the axial direction and the second pressure balancing groove 13a extending in the circumferential direction. The first pressure balancing grooves 13 are configured to open to the one side in the axial direction so as to be connected to the second pressure balancing groove 13a. The first pressure balancing grooves 13 are disposed at six places on each seal ring part 10A. In addition, the second pressure balancing groove 13a is disposed at one place on each seal ring part 10A so as to extend over a substantially entire area thereof in the circumferential direction.

The compression spring holes 14 are formed at three places on each seal ring part 10A. The key groove 15 is formed at one place on each seal ring part 10A. Then, on the seal ring 10 as a whole, the compression spring holes 14 are formed at a total of nine places, and the nine compression springs 30 are fitted. In addition, on the seal ring 10 as a whole, the key grooves 15 are formed at a total of three places, and three keys 50 are engaged with the key grooves 15.

<Support Member>

Figure 5:
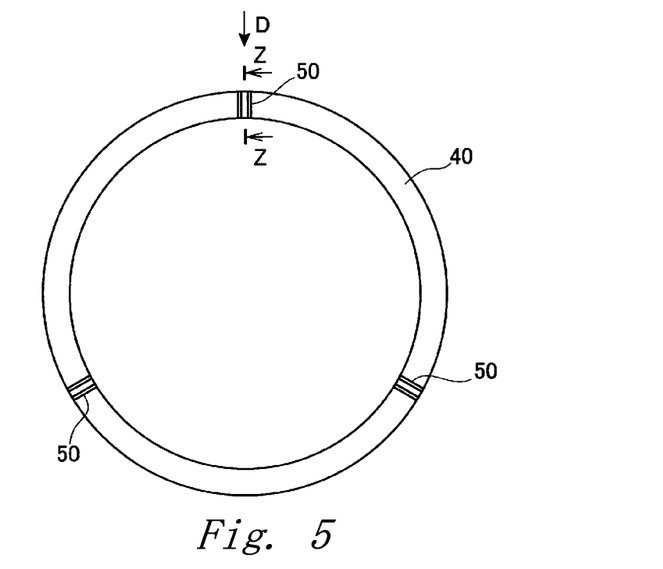
FIG. 5 is a view looking at a support member according to the example of the present disclosure from the other side in the axial direction.
Figure 6:
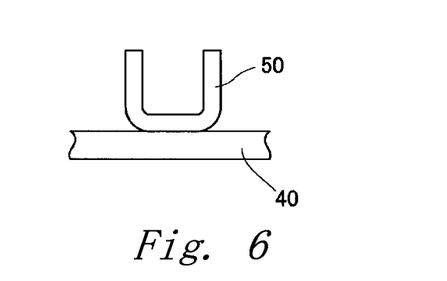
FIG. 6 is a part of a view of the support member seen from an outer peripheral surface side thereof according to the example of the present disclosure.
Figure 7:
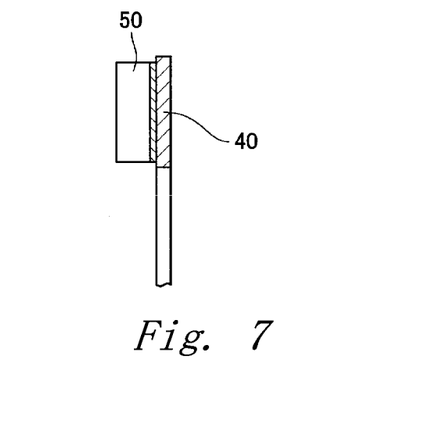
FIG. 7 is a cross sectional view of the support member according to the example of the present disclosure.

The support member according to the example will be described, while referring to FIG. 5 through FIG. 7 in particular. FIG. 5 is a view looking at the support member according to the example from the other side in the axial direction. FIG. 6 is a part of a view of the support member according to the example seen from an outer peripheral surface side thereof, and is a view seen in a direction of arrow D in FIG. 5. FIG. 7 is a cross sectional view of the support member according to the example, and is a ZZ cross sectional view in FIG. 5.

The support member has a configuration in which the key 50 is secured to the plate 40, as described above. The plate 40 and the key 50 are each composed of metal material. The plate 40 is a disc-like member having a hole, and the key 50 has a substantially U-shaped cross section. Then, the keys 50 are secured to the plate 40 at intervals of 120 degrees at a total of three places by welding.

<Usage State of the Segmented Seal>

A usage state of the segmented seal 100 according to the example will be described, while referring to FIG. 8 and FIG. 9 in particular.

As described above, the segmented seal 100 is fitted into the annular concave portion 310. Here, a fitting procedure of the segmented seal 100 will be described briefly. First, the annular seal ring 10 is assembled by combining three seal ring parts 10A. In this state, the extension spring 20 is fitted into the groove 11 formed in the seal ring 10. Then, the seal ring 10 is inserted into the annular concave portion 310. Thereafter, the compression springs 30 are fitted into each of the compression spring holes 14 that are formed on the seal ring 10 in a total of nine places thereof. Subsequently, the support member is fitted into the annular concave portion 310 in such a manner that each of the keys 50 disposed at the three places is engaged with each of the key grooves 15 formed on the seal ring 10 at the three places thereof. After that, the snap ring 60 is inserted in the annular groove 320 formed on the inner peripheral surface of the annular concave portion 310. In this manner, the segmented seal 100 is fitted into the annular concave portion 310. Thereafter, the rotating shaft 200 is inserted, and the housing 300 is fixed to a various kind of equipment.

In a state in which the segmented seal 100 is fitted into the annular concave portion 310, the seal ring 10 is pressed toward the side wall face side of the annular concave portion 310 by means of the nine compression springs 30. As a result, the seal ring 10 comes into a state of being in an intimate contact with this side wall face. In addition, the keys 50 disposed at three places that are secured to the housing 300 through the plate 40 and the snap ring 60 are being engaged with each of the key grooves 15. Accordingly, the seal ring 10 is locked against rotation. In other words, the seal ring 10 comes into a state in which it does not rotate with respect to the housing 300. As a result, in a state in which the rotating shaft 200 is being rotated, the seal ring 10 maintains a stationary state with respect to the housing 300, while it slides in between the inner peripheral surface of the seal ring 10 and the outer peripheral surface of the rotating shaft 200.

With the constitution as stated above, sealing portions will be formed between the seal ring 10 and the side wall face of the annular concave portion 310, and between the inner peripheral surface of the seal ring 10 and the outer peripheral surface of the rotating shaft 200, respectively. As a result, it becomes possible to suppress fluid to be sealed, such as a high pressure gas or the like, that is sealed in the right side region in FIG. 8 and FIG. 9, from leaking to the left side region in these figures through the segmented seal 100. Here, the fluid to be sealed is introduced into the pressure balancing groove 12 formed on the other side in the axial direction of the seal ring 10 and into the pressure balancing grooves (the first pressure balancing grooves and the second pressure balancing groove 13a) formed on the inner peripheral surface side of the seal ring 10. Accordingly, even if the pressure of the fluid to be sealed becomes high, it is possible to keep the pressure balance between the outer peripheral surface side and the inner peripheral surface side of the seal ring 10, as well as the pressure balance between the both sides in the axial direction. As a result, the sliding wear of the seal ring 10 can be suppressed, and hence it becomes possible to attain an extended product lifespan.

<Keys and Key Grooves>

Figure 10:
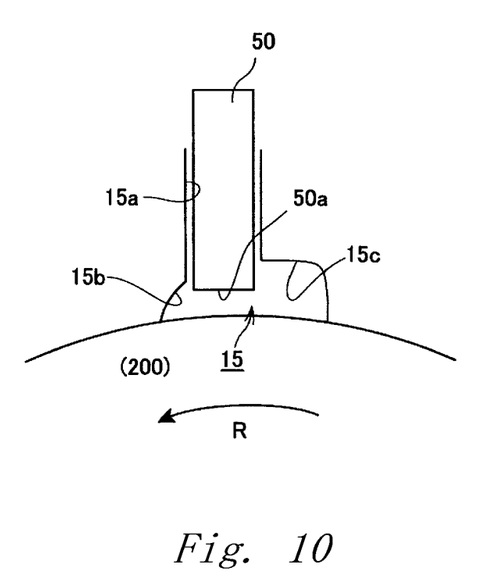
FIG. 10 is a view showing the positional relation between a key and a key groove in the segmented seal according to the example of the present disclosure.
Figure 11:
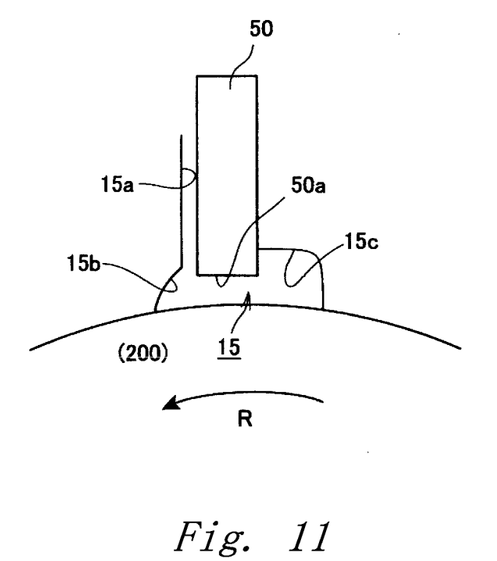
FIG. 11 is a view showing the positional relation between the key and the key groove in the segmented seal according to the example of the present disclosure.

The keys 50 and the key grooves 15 according to the example will be described in more detail, while referring to FIG. 10 and FIG. 11 in particular. FIG. 10 and FIG. 11 are views showing the positional relations between the key 50 and the key groove 15 of the segmented seal 100 according to the example, when they are in a state in which the key 50 is engaged with the key groove 15. Here, note that FIG. 10 shows an initial state, and FIG. 11 shows a state after a prolonged use.

As illustrated, the key groove 15 has, as seen in the axial direction, a groove body portion 15a extending in the radial direction and a pair of clearance groove portions 15b, 15c expanding and to both sides of the groove body portion 15a so as to be away from the key 50 on the inner peripheral surface side. And, among these one pair of clearance groove portions 15b, 15c, the clearance groove portion 15c on an upstream side in a rotating direction R of the rotating shaft 200 is configured to expand to the outer peripheral surface side beyond a tip end 50a on the inner peripheral surface side of the key 50. In addition, the upstream side clearance groove portion 15c is configured such that its radial and circumferential dimensions are large as compared with the downstream side clearance groove portion 15b. Here, note that the clearance groove portion 15b on a downstream side in the above-described rotating direction R has, as seen in the axial direction, a shape that expands in an arc-like manner so as to be away from the key 50. In contrast, the upstream side clearance groove portion 15c has, as seen in the axial direction, a shape that expands in a substantially rectangular manner (but corner portions thereof are composed of curved faces (so-called R faces)) so as to be away from the key 50.

Here, when in a state in which the key 50 is being engaged with the key groove 15, the both sides of the key 50 are in a state in which they are in partial contact with the both wall faces of the groove body portion 15a, and slight clearances are partially formed between the both sides of the key 50 and the both side wall faces of the groove body portion 15a. In an initial state, the key 50 is positioned in the center of the groove body portion 15a. However, as wear progresses in contacting portions between the key 50 and the groove body portion 15a due to a prolonged use, the key 50 tends to shift within the key groove 15 to a side wall face side on the upstream side in the rotating direction R of the rotating shaft 200. In FIG. 11, there is shown a state in which the key 50 has shifted within the key groove 15 to the side wall face side on the upstream side in the rotating direction R of the rotating shaft 200.

<Advantages of the Segmented Seal According to the Example>

As described above, in the segmented seal 100 according to the example, a pair of clearance groove portions 15b, 15c are formed with the key groove 15 formed on the seal ring 10. As a result, the vibration from the rotating shaft 200 becomes less likely to transmit to the contacting portions between the key groove 15 and the key 50, thus it becomes possible to suppress the progress of the wear of the key groove 15. In addition, a force received from the rotating shaft 200 can be dispersed more, and hence the concentration of stress can be mitigated more, as compared with a case where a groove is composed of only a straight groove without a clearance groove portion being formed. As a result, the progress of the wear of the key groove 15 is suppressed.

In addition, as described above, due to a prolonged use, the key 50 tends to shift within the key groove 15 to a side wall face side on the upstream side in the rotating direction R of the rotating shaft 200. Accordingly, in cases where no countermeasure is taken, wear tends to progress on this side wall face side on the upstream side within the key groove 15. However, in the segmented seal 100 according to the example, this upstream side clearance groove portion 15c is configured to expand to the outer peripheral surface side beyond the tip end 50a on the inner peripheral surface side of the key 50. Accordingly, it is possible to prevent the tip end 50a on the inner peripheral surface side of the key 50 from making contact with the side wall face of the key groove 15 (the groove body portion 15a), thereby making it possible to suppress the progress of the wear of the key groove 15 effectively.

Moreover, in the example, this upstream side clearance groove portion 15c is configured such that its radial and circumferential dimensions are large as compared with the downstream side clearance groove portion 15b. In other words, the dimensions of the clearance groove portion 15c, that is a side with a tendency for the wear to progress, are set to be large. Thus, it is possible to suppress the progress of the wear of the key groove 15 more effectively. Here, note that if the dimensions of both of the pair of clearance groove portions 15b, 15c are made large, a strength degradation of the seal ring 10 itself may be caused. In contrast, in the example, only the dimensions of the upstream side clearance groove portion 15c are made large, so that the progress of the wear of the key groove 15 can be suppressed, while also suppressing the strength degradation.

Further, in the example, the upstream side clearance groove portion 15c is configured, as seen in the axial direction, such that it expands in a substantially rectangular manner so as to be away from the key 50. With such a configuration, it is possible to make the area of the clearance groove portion 15c as a whole broader, in comparison with a case where the upstream side clearance groove portion 15c is configured so as to expand in an arc-like manner. However, with respect to the shape of the upstream side clearance groove portion 15c, it is not limited to this one, thus various kind of shapes can be adopted according to a usage environment. Accordingly, as with the downstream side clearance groove portion 15b, the upstream side clearance groove portion 15c, too, may be given a shape that expands in an arc-like manner, as seen in the axial direction, so as to be away from the key 50.

(Others)

In the above-described example, there has been shown the case where the seal ring 10 has a structure in which it is segmented into three segments in the circumferential direction, but with respect to seal rings to which the present disclosure can be applied, the number of segments is not at all limited. In addition, with respect to seal rings to which the present disclosure can be applied, the number of the keys and the number of the key grooves are not limited, either. Moreover, although in the above-described example, there has been shown the case where the rotating shaft is composed of a single piece, the present disclosure can also be applied to a case where the rotating shaft is composed of a shaft body and a runner (annular member) that is fitted on an outer periphery of the shaft body so as to protect the shaft body. In this case, the seal ring 10 is disposed to be slidable on an outer peripheral surface of the runner. Furthermore, although in the above-described example, there has been shown the case where the support member is configured such that the plate 40 and the keys 50 are secured to each other by welding or the like, the present disclosure can also be applied to a case where the support member is composed of a unitary structure of a plate and keys.

Figure 12:
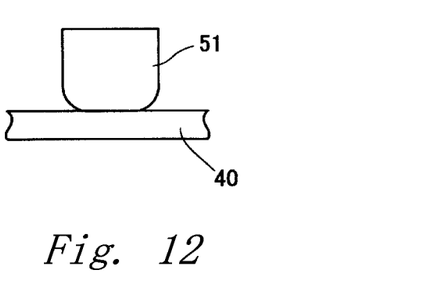
FIG. 12 is a view showing a first modification of the key according to the example of the present disclosure.
Figure 13:
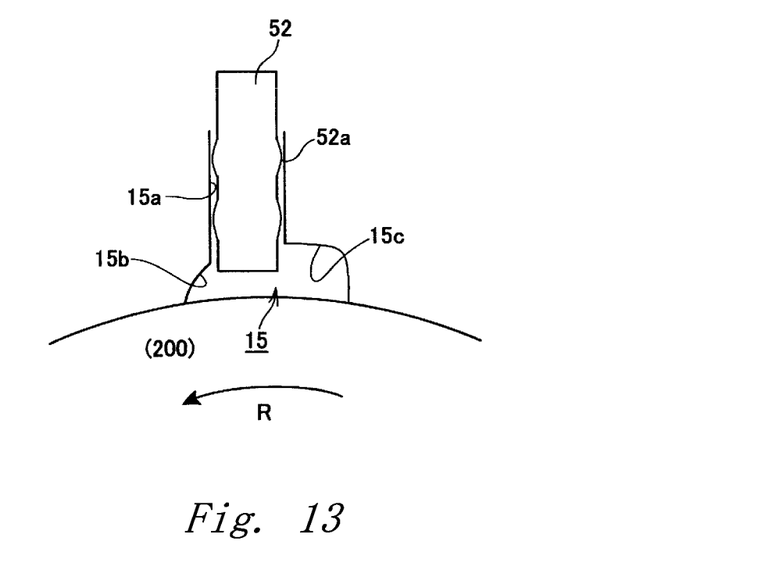
FIG. 13 is a view showing a second modification of the key according to the example of the present disclosure.

In addition, although in the above-described example, there has been shown the case where the key 50 is composed of a member having a substantially U-shaped cross section, the structure of a key which can be applied in the present disclosure is not limited to what is shown in the above-described example. For example, there may be used a block-like member with a substantially rectangular cross section, such as a key 51 shown in FIG. 12. Although the above-described key 50 is superior in terms of ease of engagement with the key groove 15 or ease of welding, in case an increase of the strength thereof is needed, the key 51 shown in FIG. 12 may be adopted. Here, note that FIG. 12 corresponds to FIG. 6 (the view seen in the direction of the arrow D in FIG. 5) shown in the above-described example. In addition, there may be adopted a configuration in which, like a key 52 shown in FIG. 13, a plurality of arc-shaped protrusions 52a that abut against the side wall faces of the key groove 15 are formed on both side wall faces of the key 52. If such a configuration is adopted, the key 52 becomes more apt to follow the vibration of a rotating shaft 200, and hence a sealing performance will be increased, and there will be an advantage that it becomes less likely for a tip edge portion of the key 52 to abut against the key groove 15. Here, note that FIG. 13 corresponds to FIG. 10 shown in the above-described example.

REFERENCE SIGNS LIST

10 seal ring
10A seal ring part
11 groove
12 pressure balancing groove
13 first pressure balancing groove
13*a* second pressure balancing groove
14 compression spring hole
15 key groove
15*a* groove body portion
15*b*, 15*c* clearance groove portion
16 engagement convex portion
16*a* inclined face
17 engagement concave portion
17*a* inclined face
20 extension spring
30 compression spring
40 plate
50 key
50*a* tip end
60 snap ring
100 segmented seal
200 rotating shaft
300 housing
310 annular concave portion
320 annular groove

The invention claimed is:

1. A segmented seal to seal an annular gap between a rotating shaft and a housing having a shaft hole through which the rotating shaft is inserted and having an annular concave portion opened to each of an inner peripheral surface side and one side in an axial direction, the segmented seal comprising:

a seal ring made of carbon being in intimate contact with a side wall face of the annular concave portion, and being disposed to be slidable on an outer peripheral surface of the rotating shaft, the seal ring being structured to be segmented into a plurality of segments in a circumferential direction thereof; and a key being secured to the housing in a state of being engaged with a key groove provided on the one side in the axial direction of the seal ring; wherein the key groove, as seen in an axial direction, has a groove body portion extending in a radial direction and a pair of clearance groove portions, each of the pair of clearance groove portions expanding to each side of the groove body portion respectively so as to be away from the key on the inner peripheral surface side, and among the pair of clearance groove portions, a clearance groove portion on an upstream side in a rotating direction of the rotating shaft is configured to expand to an outer peripheral surface side beyond a tip end on an inner peripheral surface side of the key, and is configured such that radial and circumferential dimensions thereof are large as compared with a clearance groove portion on a downstream side.

* * * * *